(12) United States Patent
Carlsson et al.

(10) Patent No.: US 6,259,906 B1
(45) Date of Patent: *Jul. 10, 2001

(54) APPARATUS AND METHOD FOR INDICATING SERVICE SUBSCRIPTION SELECTION IN A CELLULAR COMMUNICATION SYSTEM

(75) Inventors: Karl Ove Roger Carlsson; Inger Marianne Andersson, both of Linköping; John Christer Axelsson, Rimforsa, all of (SE)

(73) Assignee: Telefonaktiebolaget L M Ericsson (publ) (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/915,024

(22) Filed: Aug. 20, 1997

(51) Int. Cl.$^7$ .................................................. H04B 1/00
(52) U.S. Cl. ......................... 455/403; 455/552; 455/553
(58) Field of Search .................... 455/403, 426, 455/432, 433, 434, 437, 438, 439, 445, 416, 414, 458, 460, 463, 519, 525, 550, 552, 553

(56) References Cited

U.S. PATENT DOCUMENTS

| | | | |
|---|---|---|---|
| 5,557,664 | 9/1996 | Burns et al. ........................ | 379/114 |
| 5,579,379 | 11/1996 | D'Amico et al. ................... | 379/112 |
| 5,592,535 | 1/1997 | Klotz ..................................... | 379/58 |
| 5,625,671 | 4/1997 | Salin ..................................... | 379/58 |
| 5,631,947 | 5/1997 | Wittstein et al. ..................... | 379/59 |
| 5,678,179 | * 10/1997 | Turcottr et al. ...................... | 455/331 |
| 5,793,866 | * 8/1998 | Brown et al. ......................... | 380/2 |
| 5,901,352 | * 5/1999 | St-Pierre et al. ..................... | 455/426 |
| 5,963,863 | * 10/1999 | Berggren ............................. | 455/445 |
| 6,038,445 | * 3/2000 | Alperovich .......................... | 455/422 |
| 6,058,308 | * 5/2000 | Kallin et al. ......................... | 455/432 |
| 6,073,015 | * 6/2000 | Berggren et al. .................... | 455/432 |
| 6,134,443 | * 1/2001 | Spann et al. ......................... | 455/450 |
| 6,169,898 | * 1/2001 | Hsu et al. ............................. | 455/432 |

FOREIGN PATENT DOCUMENTS

| | | |
|---|---|---|
| 0762 714 A2 | 3/1997 | (EP) . |
| WO 94 21075 | 9/1994 | (WO) . |
| WO 96 28945 | 9/1996 | (WO) . |
| WO 97 25828 A | 7/1997 | (WO) . |

OTHER PUBLICATIONS

ISR for PCT/SE 98/01432 completed on Dec. 4, 1998.

User Profile Identification in Future Mobile Telecommunications Systems, by G.P. Eleftheriadis and M.E. Theologou, vol. 8, No. 5, XP 000606584, IEEE Network: The Magazine of Computer Communications, Sep./Oct. 1994, pp. 33–39.

Japanese Patent Abstract; Charging Information Notice System; Appl. No. 64–149458; Takakazu Tamura.

* cited by examiner

*Primary Examiner*—William Trost
*Assistant Examiner*—Congvan Tran
(74) *Attorney, Agent, or Firm*—Jenkens & Gilchrist, A Professional Corporation

(57) ABSTRACT

Method and apparatus for providing a mobile terminal with an indication of the service subscription being used by the mobile terminal. When received at a mobile terminal, the indications are displayed upon a display element. The display of the indication of the selected service subscription minimizes uncertainty to a user of the mobile terminal as to which service subscription calls originated at, or terminated at, the mobile terminal are being charged.

30 Claims, 4 Drawing Sheets

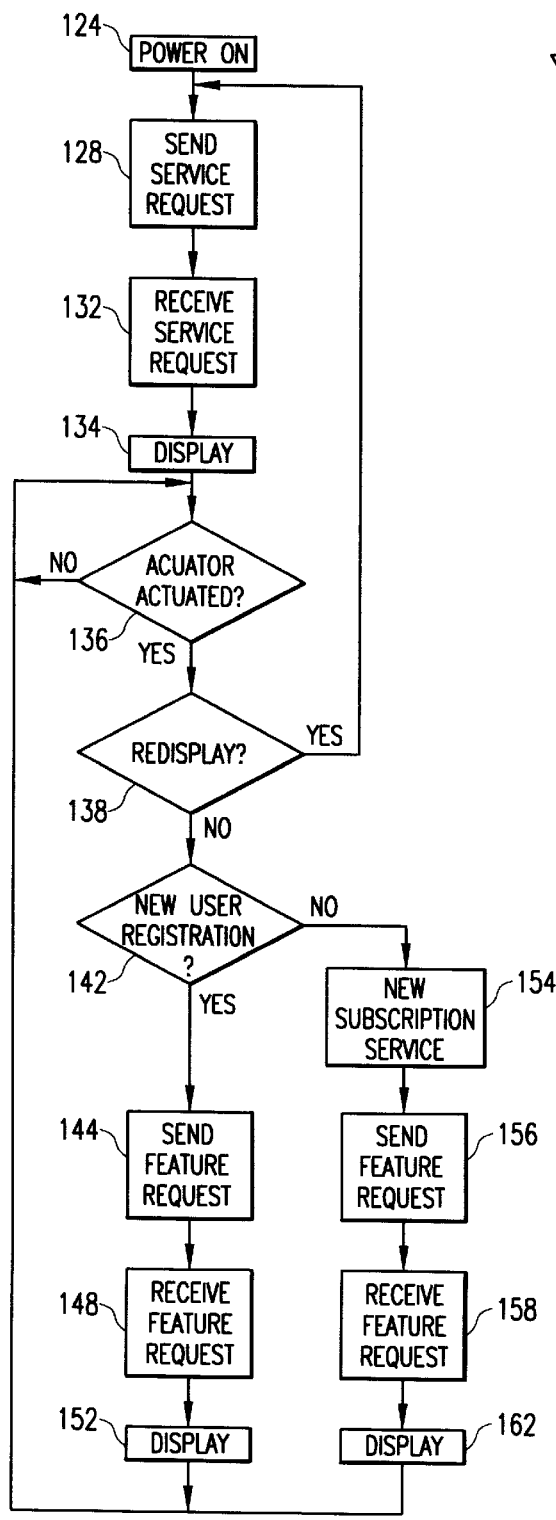
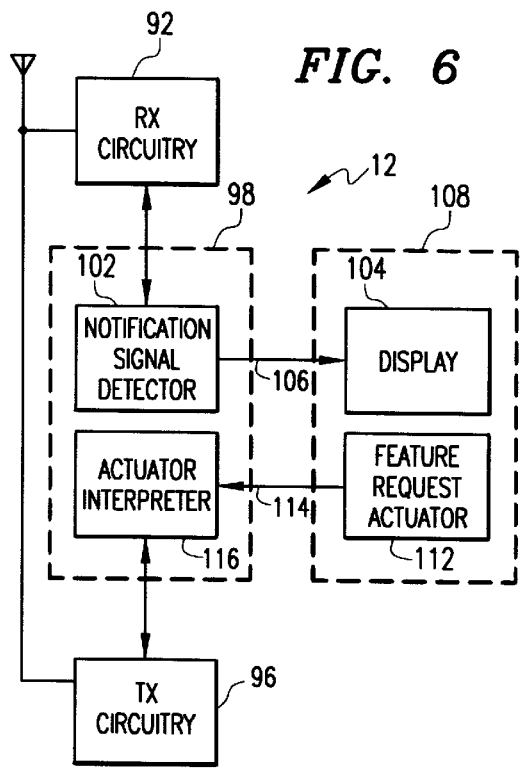
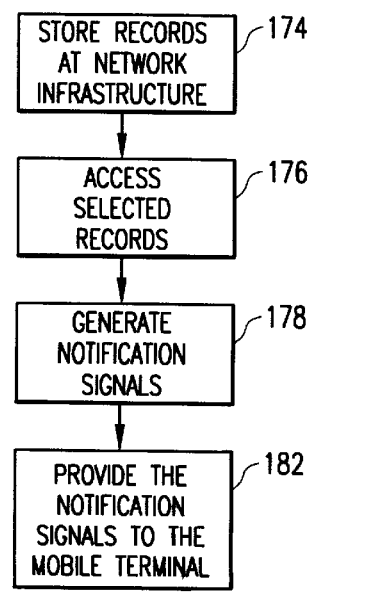

APPARATUS AND METHOD FOR INDICATING SERVICE SUBSCRIPTION SELECTION IN A CELLULAR COMMUNICATION SYSTEM

CROSS-REFERENCE TO RELATED APPLICATIONS

The present invention is related to application Ser. No. 08/840,123, filed on Apr. 9, 1997 and to application Ser. No. 08/585,149, filed on Jan. 10, 1996, the contents of which are incorporated herein by reference.

The present invention relates generally to a radio communication system in which communications with a mobile terminal are made pursuant to a selected one of two or more service subscriptions. More particularly, the present invention relates to apparatus, and an associated method, by which to present to a mobile terminal, an indication of which of the service subscriptions pursuant to which the communications with the mobile terminal are being made.

When the indication of which of the service subscriptions pursuant to which the communications with the mobile terminal are being made is presented to the mobile terminal, the indication is displayed upon a display element of the mobile terminal. The indication is provided to the mobile terminal, e.g., upon initial powering-on of the mobile terminal, responsive to user request, responsive to registration of a different user of the mobile terminal, or responsive to a user selection of an alternate service subscription.

Display of the selected service subscription minimizes uncertainty to a user of the mobile terminal as to which service subscription calls made by way of the mobile terminal are to be charged.

BACKGROUND OF THE INVENTION

A communication system is formed, at a minimum, by a transmitter and a receiver interconnected by a communication channel. Communication signals generated by the transmitter are transmitted upon the communication channel to be received by the receiver.

A radio communication system is a communication system in which the communication channel is formed of a portion of the electromagnetic frequency spectrum. A fixed or hard-wired connection is not required between the transmitter and the receiver to provide a communication path for the communication channel. A radio communication system is therefore advantageously utilized when the use of such fixed or hard-wired connections would be inconvenient or impractical.

A cellular communication system is exemplary of a radio communication system. A cellular communication system is a multi-user communication system. Users communicate by way of mobile terminals with selected fixed-site transceivers forming portions of the network infrastructure of the communication system.

The fixed-site transceivers of the network infrastructure are positioned at spaced-apart locations throughout a geographical area to be encompassed by the cellular communication system. Each of the fixed-site transceivers defines a cell and channels are allocated to each of the cells for communications between mobile terminals and the base stations therein. A cellular communication system makes relatively efficient use of the portion of the electromagnetic frequency spectrum allocated thereto as the channels assigned to the cells can be reused in others of the cells according to a channel allocation scheme.

Access to the cellular communication system to communicate therethrough is limited to those who subscribe for service with an operator of the cellular communication system. That is to say, only when a subscription for service is purchased can a user utilize a mobile terminal to communicate by way of the cellular communication system.

When a service subscription is purchased, the user of a mobile terminal is able to communicate through a mobile terminal by way of the network infrastructure of the cellular communication system. When a call is originated at the mobile terminal or a call is terminated at the mobile terminal operable pursuant to the service subscription, signaling and authentication protocols are carried out to permit the call to be originated or terminated, as appropriate, at the mobile terminal. And, the service subscription provides the operator of the cellular communication system with a manner by which to keep track of the calls and to create billing records by which to bill for usage of the cellular communication system.

Historically, a single service subscription was typically associated with a particular mobile terminal. That is to say, all communications effectuated through a particular mobile terminal have been charged to a single service subscription. All calls originated or terminated at the mobile terminal were charged to that service subscription irrespective of the user of the mobile terminal.

The aforementioned, co-pending patent applications disclose, inter alia, a manner by which a mobile terminal can selectively originate or terminate calls pursuant to more than one service subscription. For instance, a first service subscription might be associated with the mobile terminal when a user is using the mobile terminal for personal use, and a separate service subscription might be associated with the mobile terminal when the user makes use of the service subscription pursuant to business purposes. Or, separate users making use of a single mobile terminal might associate the mobile terminal with a particular one of the users so that calls originated by, or terminated at, a particular mobile terminal for different users can be associated with an appropriate one of the service subscriptions.

Such an ability to use a single mobile terminal pursuant to more than one service subscription might, however, potentially cause confusion to a user of the mobile terminal. Viz., the user might inadvertently utilize the mobile terminal to originate or to terminate calls pursuant to an other-than-intended service subscription. Charges associated with such calls thereby would be charged to the other-than-intended service subscription.

A manner by which to provide a presentment to the mobile terminal of the service subscription pursuant to which communications with the mobile terminal are made would likely reduce the uncertainty to a user of the service subscription pursuant to which the mobile terminal is operable.

It is in light of this background information related to mobile terminals operable pursuant to more than one service subscription that the significant improvements of the present invention have evolved.

SUMMARY OF THE INVENTION

The present invention, accordingly, advantageously provides apparatus, and an associated method, which presents an indication to a mobile terminal, operable in a radio communication system pursuant alternately to at least two separate service subscriptions, of which of the service subscriptions communications with the mobile terminal are being made.

Through operation of an embodiment of the present invention, the indication of the service subscription pursuant to which communications with the mobile terminal are being made is selectably displayed at the mobile terminal. Such display provides notification to a user of the mobile terminal of the service subscription to which calls terminated or originated at the mobile terminal shall be charged. User uncertainty as to which of the service subscriptions is being charged for calls is thereby reduced. Inadvertent utilization of the mobile terminal pursuant to another-than-intended service subscription is thereby less likely to occur.

In one aspect of the present invention, the indication of the service subscription pursuant to which communications with the mobile terminal are being made is presented to the mobile terminal upon initial powering-on of the mobile terminal. Thereby, the service subscription can be displayed to a user when the mobile is first powered-on. The initial service subscription may, for example, be formed of a default service subscription or a service subscription used when the mobile terminal was most-previously utilized.

In another aspect of the present invention, the indication of the service subscription pursuant to which the mobile terminal is operable is presented to the mobile terminal responsive to a user-request. For instance, in one embodiment, upon initial powering-on of the mobile terminal, the service subscription pursuant to which communications with the mobile terminal are being made is displayed for only a limited time period. If, during later operation of the mobile terminal, the user of the mobile terminal wants to reconfirm which of the service subscription pursuant to which communications with the mobile terminal are being made, upon user request, an indication of the service subscription is presented to the mobile terminal. Such indication can then be displayed upon the display element of the mobile terminal.

In another aspect of the present invention, the indication of the service subscription pursuant to which communications with the mobile terminal are being made is presented to the mobile terminal responsive to user reselection of the service subscription. That is to say, during operation of the mobile terminal, if a user desires no longer to charge calls pursuant to one service subscription but instead to charge calls to another service subscription, reselection of the service subscription is made by user actuation from the mobile terminal. When the service subscription is reselected, an indication of the new service subscription is presented to the mobile terminal.

In another aspect of the present invention, apparatus is provided for the network infrastructure of a cellular communication system which provides for presentation to a mobile terminal of an indication of which service subscription pursuant to which communications with the mobile terminal are being made. Such apparatus is operable responsive to reception at the network infrastructure of a request for presentation to the mobile terminal of the indication. The request for the presentation is made for example, pursuant to initial powering-on of the mobile terminal, responsive to a user-request, responsive to registration of a different user of the mobile terminal, or responsive to reselection of the service subscription. Once the presentation is transmitted to the mobile terminal, the indication of the service subscription pursuant to which communications with the mobile terminal are being made can be displayed upon a display element.

In another aspect of the present invention, apparatus is provided for a mobile terminal at least to receive indications generated by network infrastructure of a cellular communication system of the service subscription pursuant to which communications with the mobile terminal are being made. The mobile terminal includes a display device for displaying the indications provided thereto. The mobile terminal may further include apparatus for generating signals requesting the indications to be presented to the mobile terminal. Such request can be made, for instance, automatically responsive to powering-on of the mobile terminal, manually responsive to user-request, responsive to registration of a different user, or responsive to user-reselection of service subscriptions.

In these and other aspects, therefore, apparatus, and an associated method, is provided for a cellular communication system having a network infrastructure and a mobile terminal. The mobile terminal is capable of communicating with the network infrastructure pursuant to at least a selected one of a first service subscription and at least a second service subscription. The apparatus provides a presentation to the mobile terminal of an indication of which of the first and at least second service subscriptions pursuant to which the mobile terminal is operable. A storage device is positioned at the network infrastructure. The storage device stores records representative of at least a present service subscription pursuant to which the mobile terminal is operable. The present service subscription is formed of the selected one of the first and the at least second service subscriptions. An access device is coupled to the storage device. The access device accesses the records stored in the storage device and generates notification signals representative of the records accessed therefrom. The notification signals, when transmitted to the mobile terminal, form the presentation to the mobile terminal of which of the service subscriptions pursuant to which the mobile terminal is operable.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIG. 6 illustrates a functional block diagram of a mobile terminal forming a portion of the communication system shown in FIG. 1.

FIG. 7 illustrates a method flow diagram illustrating the method of operation of the mobile terminal of an embodiment of the present invention.

FIG. 8 illustrates a logical flow diagram of the method of an embodiment of the present invention.

DETAILED DESCRIPTION

Figures 1, 2, 3:
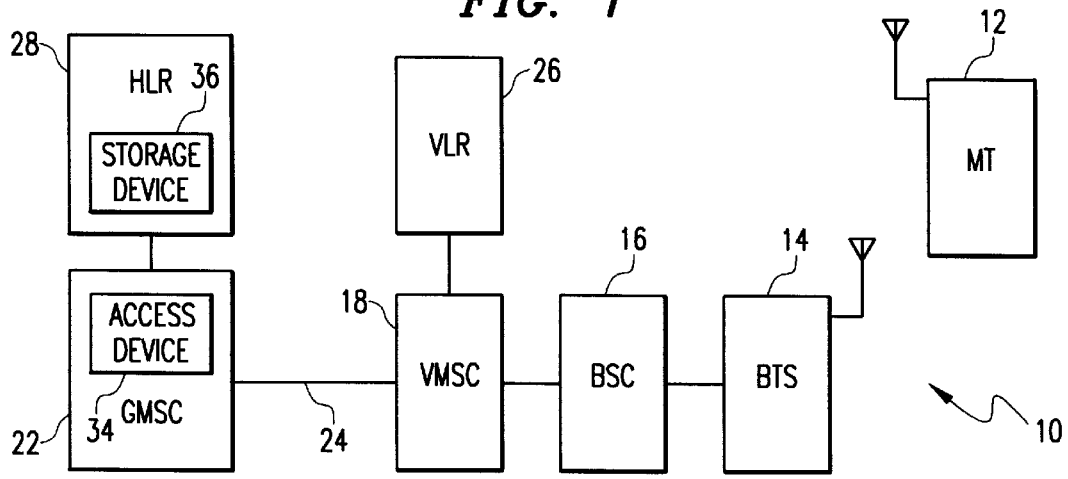
FIG. 1 illustrates a functional block diagram of a cellular communication system in which an embodiment of the present invention is operable.
FIG. 2 illustrates a portion of a storage record stored in a storage location forming a portion of the communication system shown in FIG. 1.
FIG. 3 illustrates a portion of another storage record forming a portion of the storage location of the communication system shown in FIG. 1.

Referring first to FIG. 1, a cellular communication system, shown generally at 10, permits radio communication between a mobile terminal 12 and a base transceiver station (BTS) 14 by way of a radio channels allocated to communications in such system.

The base transceiver station 14 forms a portion of the network infrastructure of the cellular communication system 10. In addition to the base transceiver station 14, the network infrastructure includes, inter alia, a base station controller 16 coupled to the base transceiver station 14, a visited mobile switching center (VMSC) 18 coupled to the BSC 16, and a gateway mobile switching center (GMSC) 22, coupled to the VMSC 18 by way of the lines 24. A visited location register (VLR) 26 is coupled to the VMSC 18, and a home location register (HLR) 28 is coupled to the GMSC 22.

The VLR 26 and the HLR 28 are indicated functionally to be separate from the VMSC 18 and GMSC 22, respectively. However, in conventional manner, the VLR 26 and HLR 28 are sometimes instead physically co-located together with the respective switching center or distributed amongst more than one discrete device.

Also in conventional manner, each mobile terminal 12 has associated therewith a home location register. For purposes of illustration, the HLR 28 forms the home location register for the mobile terminal 12. The HLR 28 forms a database for storing information related to the mobile terminal 12 and also related to other mobile terminals to which the register 28 forms a home location register. Also in conventional manner, the database which forms the home location register for the mobile terminal 12 also forms a visited location register for other mobile terminals roaming into an area defined to be encompassed by the HLR 28.

The GMSC 22 includes switching and control circuitry including an access device 34 which forms a portion of an embodiment of the present invention. And, a portion of the database forming the HLR forms a storage device which also forms a portion of an embodiment of the present invention. The access device 34 is operable to access selected storage locations of the storage device 36 not separately illustrated, an access device 34 similarly forms a portion of the VMSC 18 and a storage device 36 similarly forms a portion of the VLR 26.

As described more fully in the afore-mentioned, co-pending patent applications, information associated with the mobile terminal 12 and stored in the storage device 36 can be transferred to the VLR 26 when the mobile terminal 12 is positioned in an area defined to be encompassed by the visited location register 26. By transferring, i.e., copying, such records to the VLR 26, signaling required between the switching centers 18 and 22, and the registers 26 and 28 associated therewith, respectively, can be reduced.

As also described in the afore-mentioned, co-pending patent applications, the mobile terminal 12 is selectively operable pursuant to more than one service subscription. The service subscription pursuant to which communications with the mobile terminal 12 are made is dependent, for instance, upon which user is registered to use the mobile terminal 12 at a particular time. A single user subscribing to more than one service subscription is able to select which of the service subscriptions calls originated or terminated at the mobile terminal shall be charged.

A default service subscription may be designated as a default if no affirmative selection is made by the user of the mobile terminal 12. Such default selection may, for instance, be time-dependent. That is to say, the default selection might be a first service subscription during a first time period of a day and a second service subscription during another time period of the day. And, rather than being selectable by user, the service subscription pursuant to which the mobile terminal 12 is operable, might instead be automatically selected by a time-dependent, "allowed user list." Once the appropriate service subscription is allocated to the mobile terminal 12, charges associated with calls originating at, or terminating at, the mobile terminal 12 are billed to the appropriate service subscription.

Operation of an embodiment of the present invention provides presentations to the mobile terminal 12 of indications of which of the service subscriptions pursuant to which communications with the mobile terminal 12 are made. Once the indications of the service subscription are presented to the mobile terminal, the indication is displayed upon a display element, such as a liquid crystal display (LCD) or light emitting diode (LED) display. In another embodiment, another type of announcement device is used as the display in another human-perceptible form. By displaying the indications in human-perceptible form, a user of the mobile terminal is able quickly and easily to determine the service subscription pursuant to which the mobile terminal is operable. Thereby, user uncertainty as to which service subscription calls made by the way of the mobile terminal are to be charged is minimized.

In one embodiment, when the mobile terminal 12 is powered-on, a service request registration is transmitted by the mobile terminal 12 to the base transceiver station 14. The service request registration, once received at the network infrastructure of the communication system 10, is routed to the access device 34. Responsive to receipt of the service request registration, the access device 34 retrieves records stored at the storage device of the service subscription pursuant to which communications with the mobile terminal 12 are made. In the exemplary illustration, the service request registration is routed to the GMSC 22 as the register 28 includes the information associated with the mobile terminal 12. If the information is transferred to the VLR 26, the service request registration is routed, instead, to the VMSC 18 whereat an access device 34 formed thereat accesses the relevant storage locations of a storage device forming a portion of the register 26. Once accessed, a registration notification return is routed back to the base transceiver station 14 and then transmitted back to the mobile terminal 12 to be presented thereat. Once the information is presented to the mobile terminal 12, the information can be displayed upon a display element of the mobile terminal.

In another embodiment, a feature request is generated during operation of the mobile terminal 12. The feature request is generated, for instance, when a user of the mobile terminal 12 requests reselection of the service subscription pursuant to which calls placed or received at the mobile terminal are to be charged. A feature request is also generated, for instance, when a request is made by the user of the mobile terminal for an update of the service subscription pursuant to which communications with the mobile terminal are being made.

In like fashion with the manner by which the service request registration is routed to the access device 34, the feature request is similarly routed to the access device 34. The information is retrieved from the appropriate storage locations of the storage device 36, and the accessed information is routed back to the base transceiver station 14 and then to the mobile terminal 12. Similarly, again, once the information is presented to the mobile terminal 12, the information is displayed upon a display element of the mobile terminal.

FIG. 2 illustrates exemplary storage records, here a user subscription list 42, which is stored in the storage device 36 of the register 28. The information contained in the user subscription list 42 stored in the register 28 can be copied and transferred to corresponding locations of the VLR 26 when the mobile terminal 12 roams into the area defined to be encompassed by the VLR 26, and the mobile terminal registers with the network infrastructure thereat.

The user subscription list 42 illustrated in the Figure includes three fields. The fields define a mode of operation. The user subscription list 42 further includes a table which defines a select schedule. The select schedule indicates, by time and day, the service subscription pursuant to which communications with the mobile terminal 12 are to be made.

A first field, field 45, indicates the default subscription pursuant to which communications with the mobile terminal 12 are to be made. That is to say, unless otherwise selected by the user or by a select schedule, the service subscription automatically selected to be charged for communications with the mobile terminal 12 is the default service subscription. Here, the default service subscription is indicated to be that belonging to "Lisa."

The field 47 indicates the service subscription to which communication with the mobile terminal currently is to be charged. As illustrated, the present service subscription is that of "Ericsson". That is to say, charges for communication with the mobile terminal 12 are currently billed to the "Ericsson" service subscription.

The third field, field 49, indicates that the select schedule is "on". That is to say, by indicating in the third field 49 that the autoconnection is "on", the select schedule is utilized to determine the present service subscription pursuant to which communication with the mobile terminal is to be made.

The select schedule includes two rows, rows 51 and 53, which define, by day of the week and time period (start time-stop time) the time periods during which a particular service subscription shall be the present service subscription. Additional details related to the user subscription list 42 may be found in the afore-mentioned, co-pending patent applications.

FIG. 3 illustrates a subscription record which is also stored in storage locations of the storage device 36 shown in FIG. 1. The subscription record 55 is formed of a list of permitted users of a particular service subscription, here the "Ericsson" service subscription. A single entry is listed on the subscription record 55 for purposes of illustration. Additional entries, as appropriate, can also be listed on the subscription record. The allowed-users list of the subscription record 55 indicates times, by day and time period (start time-stop time) during which a particular user is permitted to communicate with a mobile terminal pursuant to the service subscription. Further details associated with the subscription record 55 can be found in the afore-mentioned, co-pending patent applications.

Figure 4:
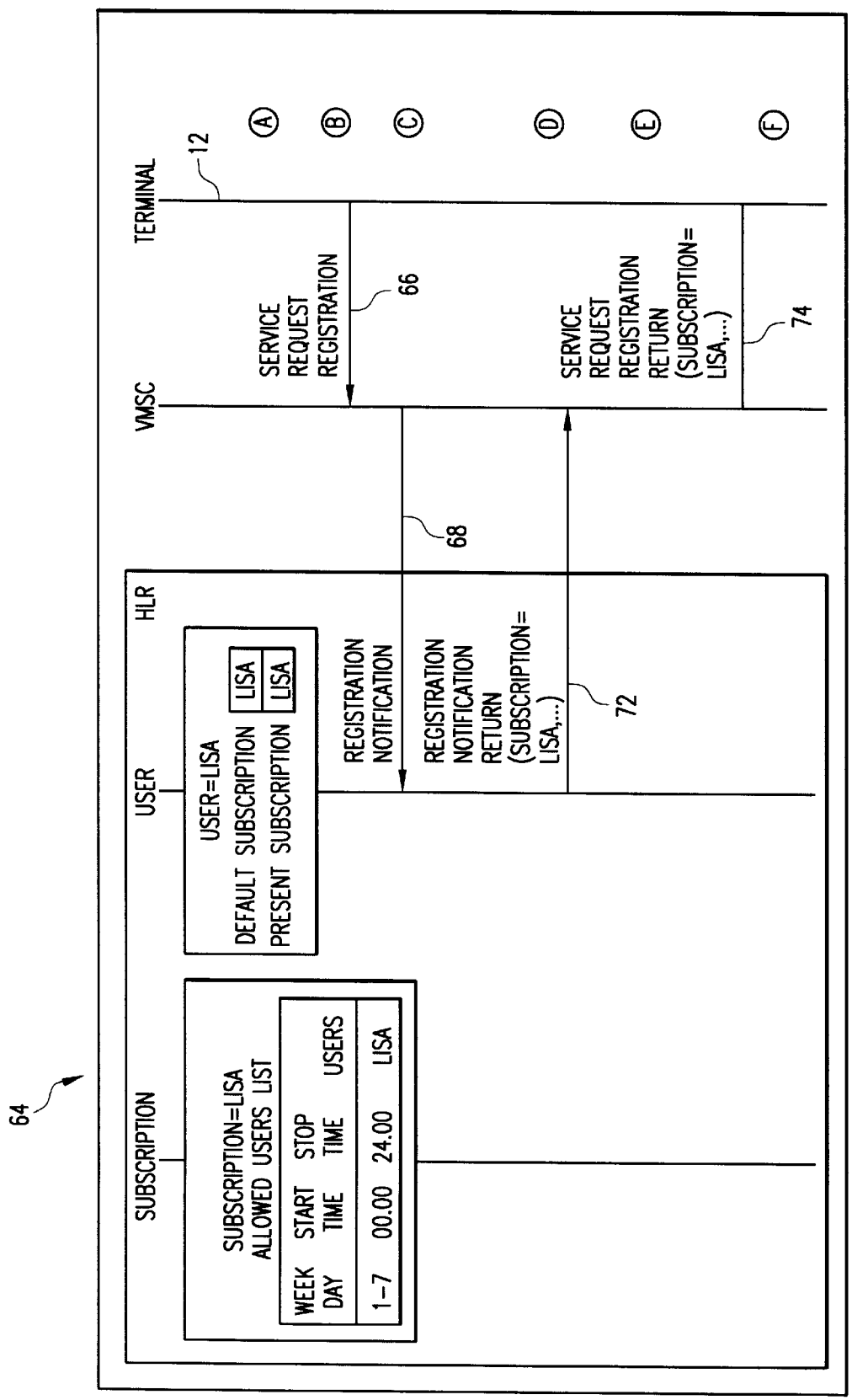
FIG. 4 illustrates a sequence diagram showing signal sequencing during operation of an embodiment of the present invention.

FIG. 4 illustrates a sequence diagram, shown generally at 64, illustrating the sequencing of signals generated during operation of an embodiment of the present invention. The sequence diagram 64 represents the generation of signals when the mobile terminal 12 is initially powered-on. In addition to conventional signaling between the mobile terminal 12 and the network infrastructure of the cellular communication system 10, a service request registration 66 is generated by the mobile terminal 12 and transmitted upon a radio link connecting the mobile terminal and the network infrastructure. The service request registration 66 is routed to the VMSC 18. A registration notification is forwarded by the VMSC to the HLR 28.

The user subscription list 42 and the subscription record 55 forming a portion of the storage device 36 of the HLR 28 are again illustrated in the sequence diagram. More particularly, the registration notification 68 causes the access device 34 to access the information stored in the storage device 36 of the HLR 28. Once the information is retrieved, a registration notification return 72 is generated and routed back to the VMSC 18. Thereafter, a service request registration return 74 is forwarded from the VMSC 18 to the mobile terminal 12.

The information contained in the registration notification return includes information indicating the present service subscription pursuant to which the mobile terminal is operable. When presented to the mobile terminal, such information is displayed upon a display element of the mobile terminal for a selected time period, such as a time period of several seconds.

Figure 5:
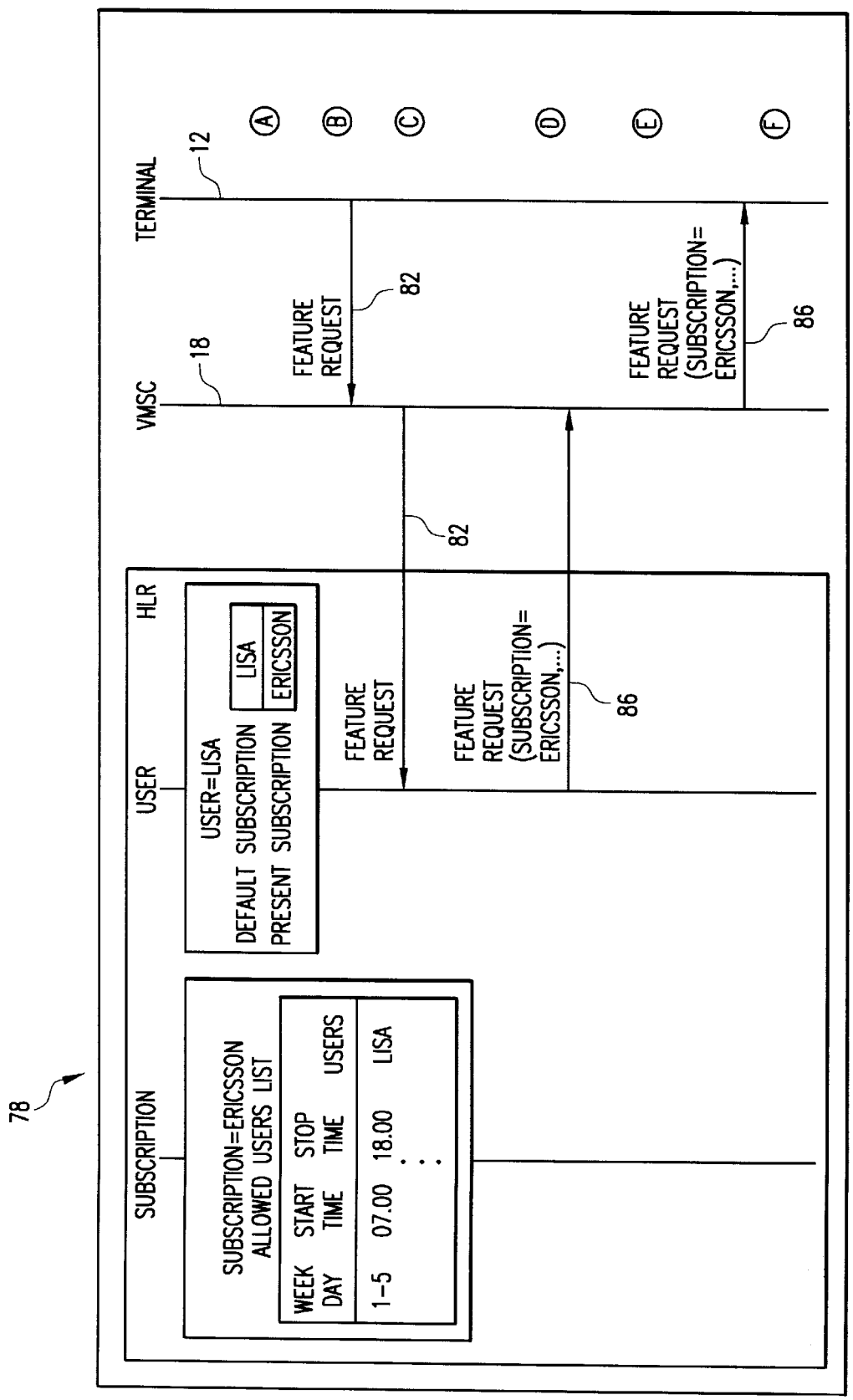
FIG. 5 illustrates a sequence diagram, similar to that shown in FIG. 4, but showing the signal sequencing during operation of another embodiment of the present invention.

FIG. 5 illustrates a sequence diagram 78 illustrating the signal sequencing responsive to user actuation of a feature request actuator during operation of the mobile terminal 12. The feature request actuator is actuated, for instance, when the user of the mobile terminal requests an update of the service subscription pursuant to which the mobile terminal is communicating, to register an alternate user of the mobile terminal, or to request reselection of the service subscription pursuant to which the mobile terminal is to be operated.

Responsive to user actuation of the feature request actuator for any of such purposes, a feature request 82 is generated by the mobile terminal 12, transmitted to the base transceiver station 14 (shown in FIG. 1), and routed to the VMSC 18. Thereafter, the feature request 82 is forwarded so that the appropriate storage locations of the storage device 36 forming a portion of the HLR 28 are accessed. Thereafter, a feature request response 86 is routed back to the VMSC 18 and thereafter forwarded on to be presented to the mobile terminal 12. Once the information accessed is presented to the mobile terminal, the information is displayed upon a display element thereof for a selected time period, again such as a time period of several seconds.

FIG. 6 illustrates the mobile terminal 12 of an embodiment of the present invention. The mobile terminal 12 forms a portion of the communication system 10, shown previously in FIG. 1. The mobile terminal 12 includes receiver circuitry 92 and transmitter circuitry 96 to permit the reception and transmission of communication signals generated during normal telephonic operation of the mobile terminal.

A controller 98 is coupled both to the receiver and transmitter circuitry 92 and 96 to control operation of such circuitry. The controller further includes a notification signal detector 102 which is coupled to the receiver circuitry 92. The notification signal detector 102 is operable to detect information transmitted by the network infrastructure and presented to the mobile terminal indicative of the service subscription pursuant to which communications with the mobile terminal are being charged.

The notification signal detector 102 is coupled to a display element, such as an LCD or LED display, 104 by way of the lines 106. When the notification signal detector detects the indications presented to the mobile terminal, signals representative of such indications are provided to the display element 104 to be displayed thereon for a selected time period.

The display element 104 forms a portion of a user interface 108. The user interface 108 further includes a feature request actuator which is actuatable by a user of the mobile terminal. The feature request actuator is actuated by the user when, as noted previously, the user desires to be updated with the present service subscription, when a different user is to be the registered user of the mobile terminal, and when the user desires to reselect the service subscription pursuant to which communications with the mobile terminal are to be charged.

The feature request actuator is coupled, by way of the lines 114, to an actuator interpreter 16. The actuator interpreter 116 forms a portion of the controller 98. The interpreter 116 interprets the input signals generated responsive to user actuation of the feature request actuator. The interpreter 116 is coupled to the transmitter circuitry 96 and is operable to cause the transmitter circuitry to generate and transmit, inter alia, feature requests for requesting updating, reselection, and new-user registration of the user of the mobile terminal.

FIG. 7 illustrates a method, shown generally at 122, of operation of the mobile terminal 12 of an embodiment of the present invention. The method 122 may, for instance, be embodied in algorithms executable by the controller 98 (shown in FIG. 6).

First, and as indicated by the block 124, the mobile terminal is powered, such as when a user of the terminal turns-on the mobile terminal. Then, and as indicated by the block 128, a service request registration is transmitted, as indicated by the block 128, by the mobile terminal to the cellular network infrastructure of the cellular system. As described previously, service subscription information indicative of the service subscription pursuant to which communications with the mobile terminal are to be charged is accessed and transmitted to the mobile terminal. Such information is received, as indicated by the block 132, at the mobile terminal. Then, the information is displayed upon a display element, as indicated by the block 134.

Thereafter, and as indicated by the decision block 136, a determination is made as to whether the feature request actuator of the mobile terminal has been actuated by a user. If not, the no branch is taken back onto the decision block. Otherwise, if the actuator has been actuated by a user, the yes branch is taken to the decision block 138. A determination is made at the decision block 138 as to whether the actuation of the feature request actuator is a request to redisplay the service subscription information. If so, the yes branch is taken back to the block 128. Otherwise, the no branch is taken to the decision block 142 whereat a determination is made as to whether the feature request actuator has been actuated to request registration of a new user of the mobile terminal.

If so, the yes branch is taken to the block 144 whereat a feature request is transmitted by the mobile terminal to the network infrastructure of the cellular system. As described previously, when the feature request is received at the network infrastructure, together with the new registration, a feature request response is generated by the network infrastructure and transmitted back to the mobile terminal.

The feature request response is received at the mobile terminal, as indicated by the block 148. And, the indications of the service subscription pursuant to which the communications with the mobile terminal are to be charged, are displayed upon a display element, as indicated by the block 152. A branch is taken thereafter back to the decision block 136.

If the no branch is taken from the decision block 142, actuation of the feature request actuator is a request for a change of service subscriptions by a single user, here indicated by the block 154. Thereafter, a feature request is transmitted by the mobile terminal, as indicated by the block 156, together with the request for the change in the service subscription. A response to the feature request is received, as indicated by the block 158 and, thereafter, indications of the service subscription pursuant to which communications with the mobile terminal are to be charged are displayed upon a display element, as indicated by the block 162. The branch is thereafter taken back to the decision block 136.

FIG. 8 illustrates a method, shown generally at 172, of an embodiment of the present invention. The method provides a presentation to a mobile terminal of an indication of a service subscription pursuant to which communications between the mobile terminal and network infrastructure are to be effectuated.

First, and as indicated by the block 174, records are stored at the network infrastructure. The records are representative of at least a present service subscription pursuant to which the mobile terminal is operable. Then, and as indicated by the block 176, selected ones of the records are accessed. Then, and as indicated by the block 178, notification signals representative of the accessed records are generated. And, as indicated by the block 182, the notification signals are provided to the mobile terminal. The notification signals form the presentation to the mobile terminal of which of the service subscriptions pursuant to which the mobile terminal is operable.

Through operation of an embodiment of the present invention, therefore, an indication of the selected service subscription pursuant to which communications with the mobile terminal are to be charged can be displayed upon a display element of the mobile terminal. The display of the selected service subscription minimizes uncertainty to the user of a mobile terminal as to which service subscription communications with the mobile terminal are charged.

The previous descriptions are of preferred examples for implementing the invention, and the scope of the invention should not necessarily be limited by this description. The scope of the present invention is defined by the following claims.

What is claimed is:

1. In a cellular communication system having a network infrastructure and a mobile terminal capable of communicating with the network infrastructure pursuant to at least a selected one of a first cellular communication service subscription and at least a second cellular communication service subscription, an improvement of apparatus for providing a presentation to the mobile terminal of an indication of which of the first and the at least second cellular communication service subscriptions pursuant to which the mobile terminal is operable, said apparatus comprising:

a storage device positioned at the network infrastructure, said storage device for storing records representative of at least a present cellular communication service subscription pursuant to which the mobile terminal is operable, the present cellular communication service subscription formed of the selected one of the first and the at least second cellular communication service subscriptions; and an access device coupled to said storage device, said access device for accessing the records stored in said storage device and for generating notification signals representative of the records accessed therefrom, the notification signals, when transmitted to the mobile terminal, forming the presentation to the mobile terminal of which of the cellular communication service subscriptions pursuant to which the mobile terminal is operable.

2. The apparatus of claim 1 wherein the network infrastructure includes a home location register associated with the mobile terminal and wherein said storage device forms a portion of the home location register.

3. The apparatus of claim 1 wherein said access device is operable to access the records in said storage device responsive to a service request registration signal generated by the mobile terminal upon initial powering-on of the mobile terminal.

4. The apparatus of claim 3 wherein the network infrastructure includes at least one mobile switching center coupled to said access device, wherein the service request registration signal generated by the mobile terminal is provided to the mobile switching center, and wherein the mobile switching center generates a registration notification signal responsive to the service request registration signal, the registration notification signal provided by the mobile switching center to said access device to cause said access device to access the records stored at said storage device.

5. The apparatus of claim 4 wherein the notification signals generated by said access device comprise a registration notification return signal, the registration notification return signal provided by said access device to the mobile switching center.

6. The apparatus of claim 5 wherein the mobile switching center generates a service request registration return signal responsive to reception thereat of the registration notification return signal, the registration notification return signal containing information which, when transmitted to the mobile terminal, forms the presentation to the mobile terminal.

7. The apparatus of claim 1 wherein said access device is operable to access the records in said storage device responsive to a feature request signal generated by the mobile terminal during operation thereof.

8. The apparatus of claim 7 wherein the mobile terminal comprises a feature request actuator and wherein the feature request signal generated by the mobile terminal is generated responsive to user actuation of the feature request actuator.

9. The apparatus of claim 8 wherein the feature request actuator, upon user actuation thereof, further permits user selection of operation of the mobile terminal pursuant to the selected one of the first cellular service subscription and the at least second cellular service subscription, and wherein the feature request signal is of a value indicative of the user selection of the operation of the mobile terminal in the selected one of the first cellular service subscription and the at least second cellular service subscription.

10. The apparatus of claim 7 wherein the network infrastructure includes at least one mobile switching center coupled to said access device, wherein the feature request signal generated by the mobile terminal is provided to the mobile switching center, and wherein the mobile switching center forwards the feature request signal, the feature request signal forwarded by the mobile switching center to said access device causing said access device to access the records stored at said storage device.

11. The apparatus of claim 10 wherein the notification signals generated by said access device comprise a feature request response signal, the feature request response signal provided by said access device to the mobile switching center.

12. The apparatus of claim 11 wherein the mobile switching center forwards the feature request response signal for transmission thereof to the mobile terminal, the feature request response signal containing information which, when transmitted to the mobile terminal, forms the presentation to the mobile terminal.

13. The apparatus of claim 1 wherein the mobile terminal further comprises a display element and wherein the notification signals generated by said access device, once transmitted to the mobile terminal, are displayed upon the display element.

14. A method for providing a presentation to a mobile terminal of an indication of a selected one of a first service subscription and at least a second service subscription pursuant to which communications between the mobile terminal and network infrastructure are to be effectuated, said method comprising the steps of:

storing records at the network infrastructure representative of at least a present service subscription pursuant to which the mobile terminal is operable, the present service subscription formed of the selected one of the first and the at least second service subscriptions;

accessing the records stored during said step of storing;

generating notification signals representative of the records accessed during said step of accessing; and providing the notification signals to the mobile terminal, the notification signals forming the presentation to the mobile terminal of which of the service subscriptions pursuant to which the mobile terminal is operable.

15. In a mobile terminal operable in a cellular communication system having network infrastructure with which the mobile terminal is capable of communicating pursuant to a selected one of a first cellular communication service subscription and at least a second cellular communication service subscription, an improvement of a user interface at least for indicating to a user which of the first and the at least second cellular communication service subscriptions pursuant to which communications between the mobile terminal and the network infrastructure are to be effectuated, said user interface comprising:

a notification signal detector coupled to receiver circuitry of the mobile terminal, said notification signal detector for detecting reception at the receiver circuitry of the mobile terminal of notification signals transmitted thereto by the network infrastructure, the notification signals indicative of which of the first and the at least second cellular communication service subscriptions forms the selected service subscription; and a display device coupled to said notification signal detector, said display device for displaying in human perceptible form an indication of which of the first and the at least second cellular communication service subscriptions forms the selected service subscription.

16. In a cellular communication system having a network infrastructure and a mobile terminal capable of communicating with the network infrastructure pursuant to at least a selected one of a first cellular communication service subscription and at least a second cellular communication service subscription, an improvement of apparatus for providing a presentation to the mobile terminal of an indication of which of the first and the at least second cellular communication service subscriptions pursuant to which the mobile terminal is operable, said apparatus comprising:

a storage device positioned at the network infrastructure, said storage device for storing records representative of at least a present cellular communication service subscription pursuant to which the mobile terminal is operable, the present cellular communication service subscription formed of the selected one of the first and the at least second cellular communication service subscriptions; and an access device coupled to said storage device, said access device for accessing the records stored in said storage device by utilizing an indication of a user of the mobile terminal and for generating notification signals representative of the records accessed therefrom, the notification signals, when transmitted to the mobile terminal, forming the presentation to the mobile terminal of which of the cellular communication service subscriptions pursuant to which the mobile terminal is operable.

17. The apparatus of claim 16 wherein the network infrastructure includes a home location register associated with the mobile terminal and wherein said storage device forms a portion of the home location register.

18. The apparatus of claim 16 wherein said access device is operable to access the records in said storage device responsive to a service request registration signal generated by the mobile terminal upon initial powering-on of the mobile terminal.

19. The apparatus of claim 18 wherein the network infrastructure includes at least one mobile switching center coupled to said access device, wherein the service request registration signal generated by the mobile terminal is provided to the mobile switching center, and wherein the mobile switching center generates a registration notification signal responsive to the service request registration signal, the registration notification signal provided by the mobile switching center to said access device to cause said access device to access the records stored at said storage device.

20. The apparatus of claim 19 wherein the notification signals generated by said access device comprise a registration notification return signal, the registration notification return signal provided by said access device to the mobile switching center.

21. The apparatus of claim 20 wherein the mobile switching center generates a service request registration return signal responsive to reception thereat of the registration notification return signal, the registration notification return signal containing information which, when transmitted to the mobile terminal, forms the presentation to the mobile terminal.

22. The apparatus of claim 16 wherein said access device is operable to access the records in said storage device responsive to a feature request signal generated by the mobile terminal during operation thereof.

23. The apparatus of claim 22 wherein the mobile terminal comprises a feature request actuator and wherein the feature request signal generated by the mobile terminal is generated responsive to user actuation of the feature request actuator.

24. The apparatus of claim 23 wherein the feature request actuator, upon user actuation thereof, further permits user selection of operation of the mobile terminal pursuant to the selected one of the first cellular service subscription and the at least second cellular service subscription, and wherein the feature request signal is of a value indicative of the user selection of the operation of the mobile terminal in the selected one of the first cellular service subscription and the at least second cellular service subscription.

25. The apparatus of claim 22 wherein the network infrastructure includes at least one mobile switching center coupled to said access device, wherein the feature request signal generated by the mobile terminal is provided to the mobile switching center, and wherein the mobile switching center forwards the feature request signal, the feature request signal forwarded by the mobile switching center to said access device causing said access device to access the records stored at said storage device.

26. The apparatus of claim 25 wherein the notification signals generated by said access device comprise a feature request response signal, the feature request response signal provided by said access device to the mobile switching center.

27. The apparatus of claim 26 wherein the mobile switching center forwards the feature request response signal for transmission thereof to the mobile terminal, the feature request response signal containing information which, when transmitted to the mobile terminal, forms the presentation to the mobile terminal.

28. The apparatus of claim 16 wherein the mobile terminal further comprises a display element and wherein the notification signals generated by said access device, once transmitted to the mobile terminal, are displayed upon the display element.

29. A method for providing a presentation to a mobile terminal of an indication of a selected one of a first service subscription and at least a second service subscription pursuant to which communications between the mobile terminal and network infrastructure are to be effectuated, said method comprising the steps of:

storing records at the network infrastructure representative of at least a present service subscription pursuant to which the mobile terminal is operable, the present service subscription formed of the selected one of the first and the at least second service subscriptions;

accessing the records stored during said step of storing by utilizing an indication of a user of the mobile terminal;

generating notification signals representative of the records accessed during said step of accessing; and providing the notification signals to the mobile terminal, the notification signals forming the presentation to the mobile terminal of which of the service subscriptions pursuant to which the mobile terminal is operable.

30. In a mobile terminal operable in a cellular communication system having network infrastructure with which the mobile terminal is capable of communicating pursuant to a selected one of a first service subscription and at least a second service subscription, an improvement of a user interface at least for indicating to a user which of the first and the at least second service subscriptions pursuant to which communications between the mobile terminal and the network infrastructure are to be effectuated, said user interface comprising:

an actuator interpreter coupled to transmitter circuitry of the mobile terminal;

a feature request actuator coupled to said actuator interpreter, said feature request actuator for requesting from the network infrastructure, by utilizing an indication of the user of the mobile terminal, notification signals indicative of which of the first and the at least second service subscriptions forms the selected service subscription;

a notification signal detector coupled to receiver circuitry of the mobile terminal, said notification signal detector for detecting reception at the receiver circuitry of the mobile terminal of the notification signals transmitted thereto by the network infrastructure, the notification signals indicative of which of the first and the at least second service subscriptions forms the selected service subscription; and a display device coupled to said notification signal detector, said display device for displaying in human perceptible form an indication of which of the first and the at least second service subscriptions forms the selected service subscription.

* * * * *